United States Patent
Slon et al.

(10) Patent No.: US 6,234,044 B1
(45) Date of Patent: May 22, 2001

(54) GEAR SHIFT LEVER BOOT COVER

(75) Inventors: Christopher M. Slon, Birmingham; Daniel B. Sauger, Macomb, both of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/368,534

(22) Filed: Aug. 4, 1999

(51) Int. Cl.[7] .............................. B60K 20/06; F16J 15/52
(52) U.S. Cl. ............................................... 74/566; 277/634
(58) Field of Search ............................ 74/566; 277/634, 277/635, 636

(56) References Cited

U.S. PATENT DOCUMENTS

| | | | |
|---|---|---|---|
| 2,786,359 | * 3/1957 | Karlan et al. | 74/566 X |
| 3,086,609 | * 4/1963 | Bryant, Jr. | 74/566 X |
| 3,800,909 | 4/1974 | Duncanson et al. | |
| 4,018,099 | 4/1977 | O'Brien et al. | |
| 4,522,081 | 6/1985 | Mackin et al. | |
| 5,560,253 | 10/1996 | Ishikawa et al. | |
| 5,707,066 | * 1/1998 | Sugiura et al. | 277/634 |
| 5,749,261 | 5/1998 | Numakami. | |

FOREIGN PATENT DOCUMENTS

0709413 * 1/1980 (SU).

* cited by examiner

Primary Examiner—Mary Ann Green
(74) Attorney, Agent, or Firm—Kenneth H. MacLean

(57) ABSTRACT

A boot and attaching frame assembly for closing an opening in a wall of a steering column shroud through which a gear shift lever extends. The assembly includes a flexible boot having a central portion provided with a passage adapted to receive the gear shift lever. A marginal position of the boot is folded inwardly upon itself to provide a terminal flange and to form a laterally inwardly opening groove. The terminal flange is adapted to engage an outer annular surface portion of the wall of the shroud around the opening therein. The assembly also includes an annular frame for securing the boot to the shroud. The frame has an annular base adapted to fit within the opening in the wall of the shroud. The frame has inner retainer tabs extending laterally outwardly from the base to engage an inner surface portion of the wall of the shroud around the opening therein. The frame has an outer retainer flange extending laterally outwardly from the base into the groove in the boot. The frame has an integral mounting strip secured to the shroud.

8 Claims, 3 Drawing Sheets

GEAR SHIFT LEVER BOOT COVER

This invention relates generally to gear shift lever boot covers and more particularly to a boot cover for closing an opening in a wall of a steering column shroud through which the gear shift lever extends.

BACKGROUND OF THE INVENTION

The opening in the steering column shroud for the gear shift lever must be large enough to accommodate tilting of the steering wheel. The cover for the opening must be sufficiently flexible to permit this tilting movement. The attachment of the cover to the shroud should be relatively rigid to effect a secure attachment and also to reinforce the shroud around the opening.

SUMMARY OF THE INVENTION

In accordance with the present invention, a boot and attaching frame assembly is provided including a boot having a central portion provided with a passage to receive the gear shift lever. A marginal portion of the boot extends outwardly from the central portion and is folded inwardly upon itself to provide a terminal flange and also to form a laterally inwardly opening groove. The terminal flange is adapted to engage and preferably seal against an outer annular surface portion of the wall of the shroud around the opening. This opening is sufficiently large to accommodate tilting of the steering wheel and shifting of the gear shift lever and the boot is sufficiently flexible to permit these movements.

The assembly also includes an annular frame for securing the boot to the shroud. The frame has an annular base adapted to fit within the opening in the shroud. The frame has an inner retainer to engage an inner surface portion of the wall of the shroud around the opening therein, and also has an outer retainer extending into the groove in the boot. Preferably, the inner and outer retainers are spaced apart a distance to snugly receive the wall of the shroud and the terminal flange of the boot. Preferably the outer retainer is in the form of a continuous annular flange and the inner retainer is in the form of a plurality of spaced apart tabs.

The frame will also preferably have an integral mounting strip which is adapted to be secured to the shroud. Preferably the mounting strip is secured to an underside portion of the wall of the shroud in a position such that it will not be visible to an occupant of the vehicle in which the steering column is installed.

The frame is preferably a relatively rigid member capable of securely attaching the boot to the shroud and also to reinforce the shroud around the opening.

One object of this invention is to provide a boot and attaching frame assembly having the foregoing features and capabilities.

Another object is to provide a boot and attaching frame assembly which is of relatively simple construction, is rugged and durable in use, and is capable of being inexpensively manufactured and easily assembled and installed.

These and other objects features and advantages of the invention will become more apparent as the following description proceeds, especially when considered with the accompany drawings.

DETAILED DESCRIPTION OF THE PREFERRED EMBODIMENT

Figure 1:
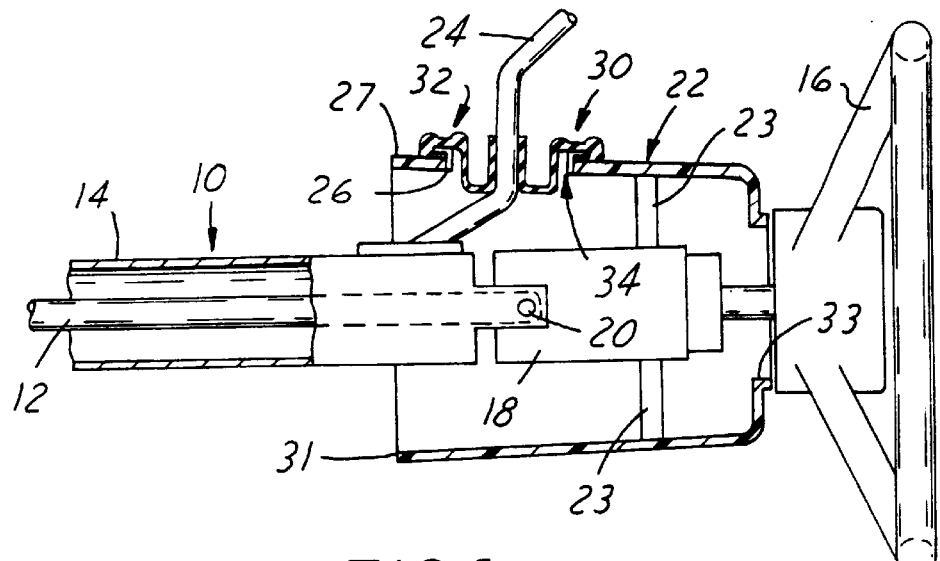
FIG. 1 is a semi-diagrammatic view of a steering column having a shroud provided with an opening for the gear shift lever, and having a boot and attaching frame assembly for closing the opening, constructed in accordance with the invention.
Figure 6:
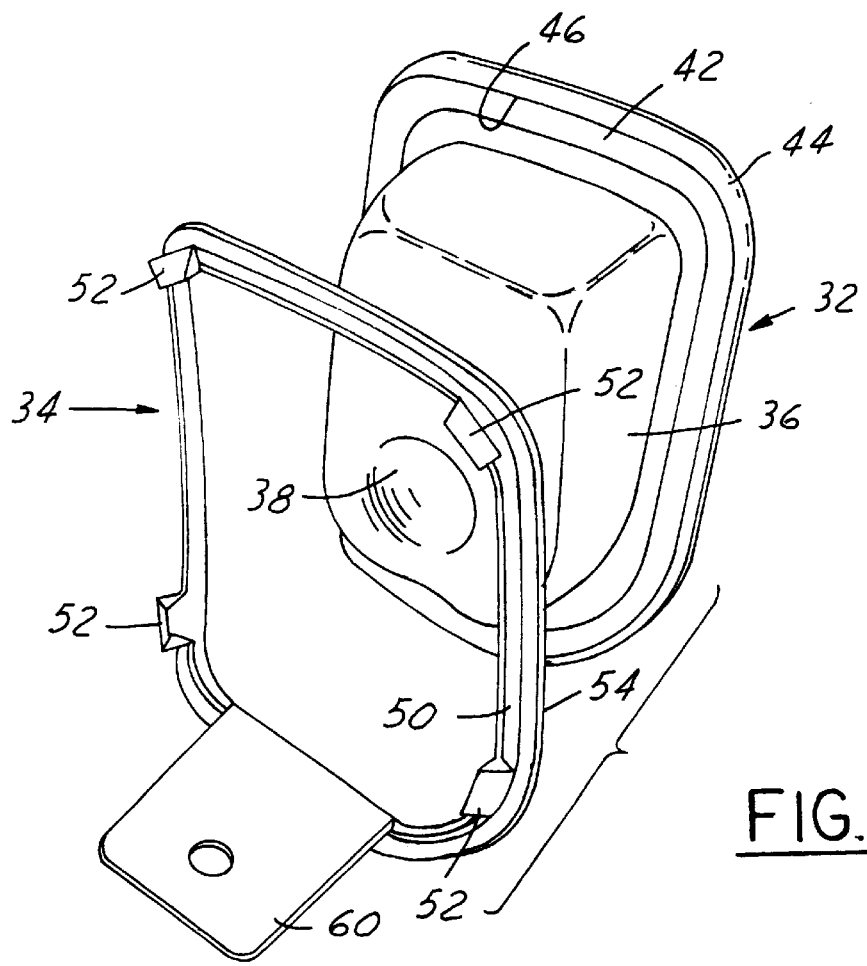
FIG. 6 is an exploded perspective view of the boot and attaching frame.
Figure 2:
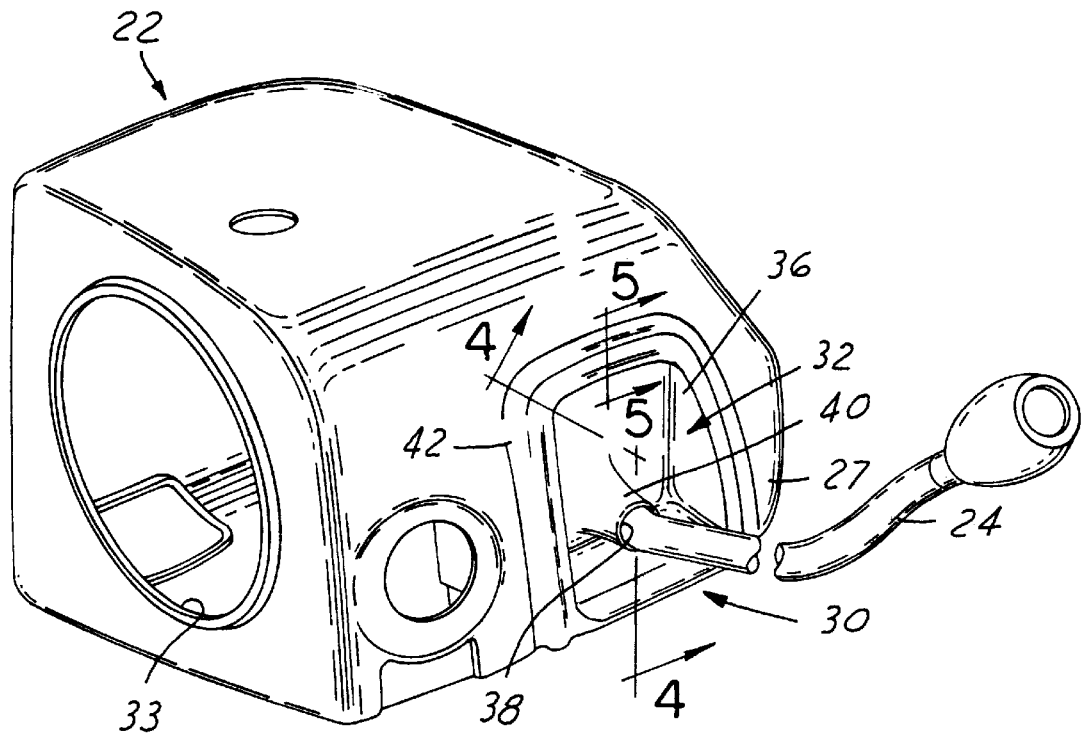
FIG. 2 is a perspective view showing the gear shift lever extending through the boot closing the opening in the shroud, the view being taken at one side and slightly above the shroud as it might be viewed by a passenger seated next to the driver of the vehicle in which the steering column is installed.
Figure 3:
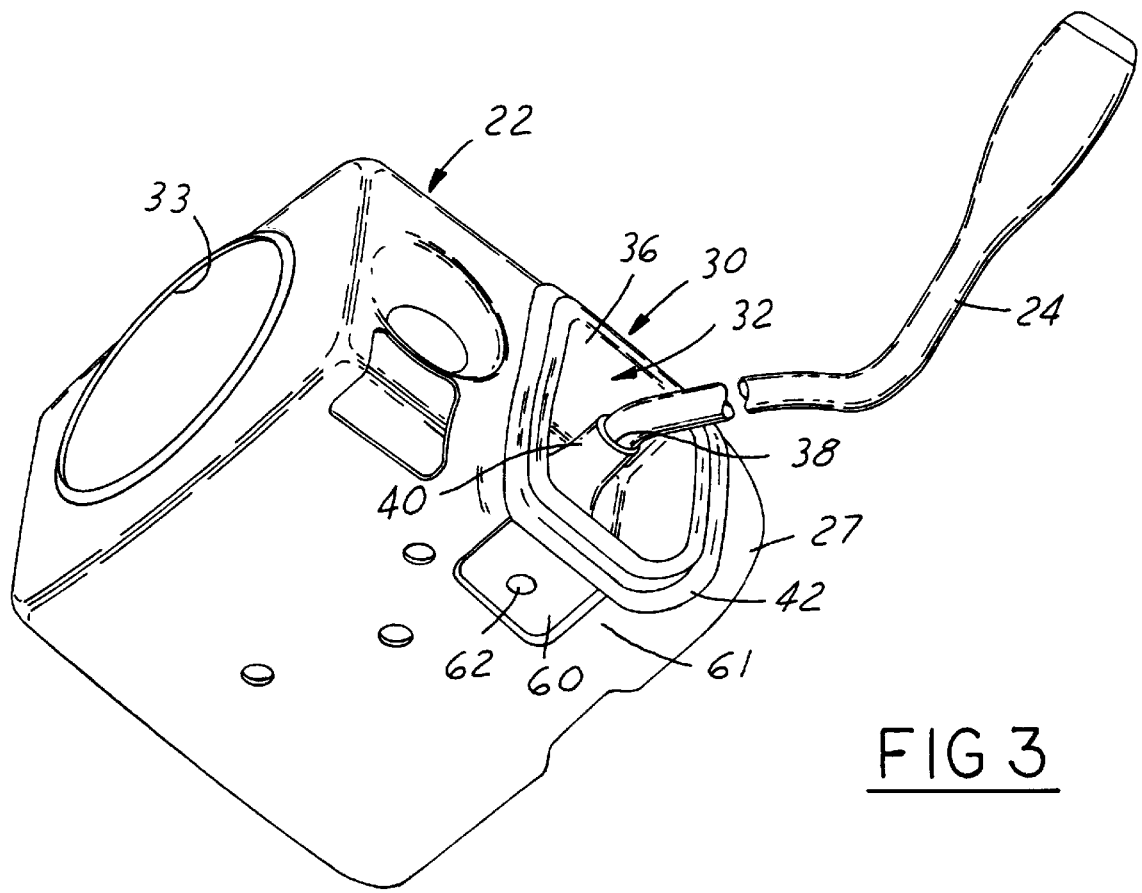
FIG. 3 is a view similar to FIG. 1 but as seen from below.
Figure 4:
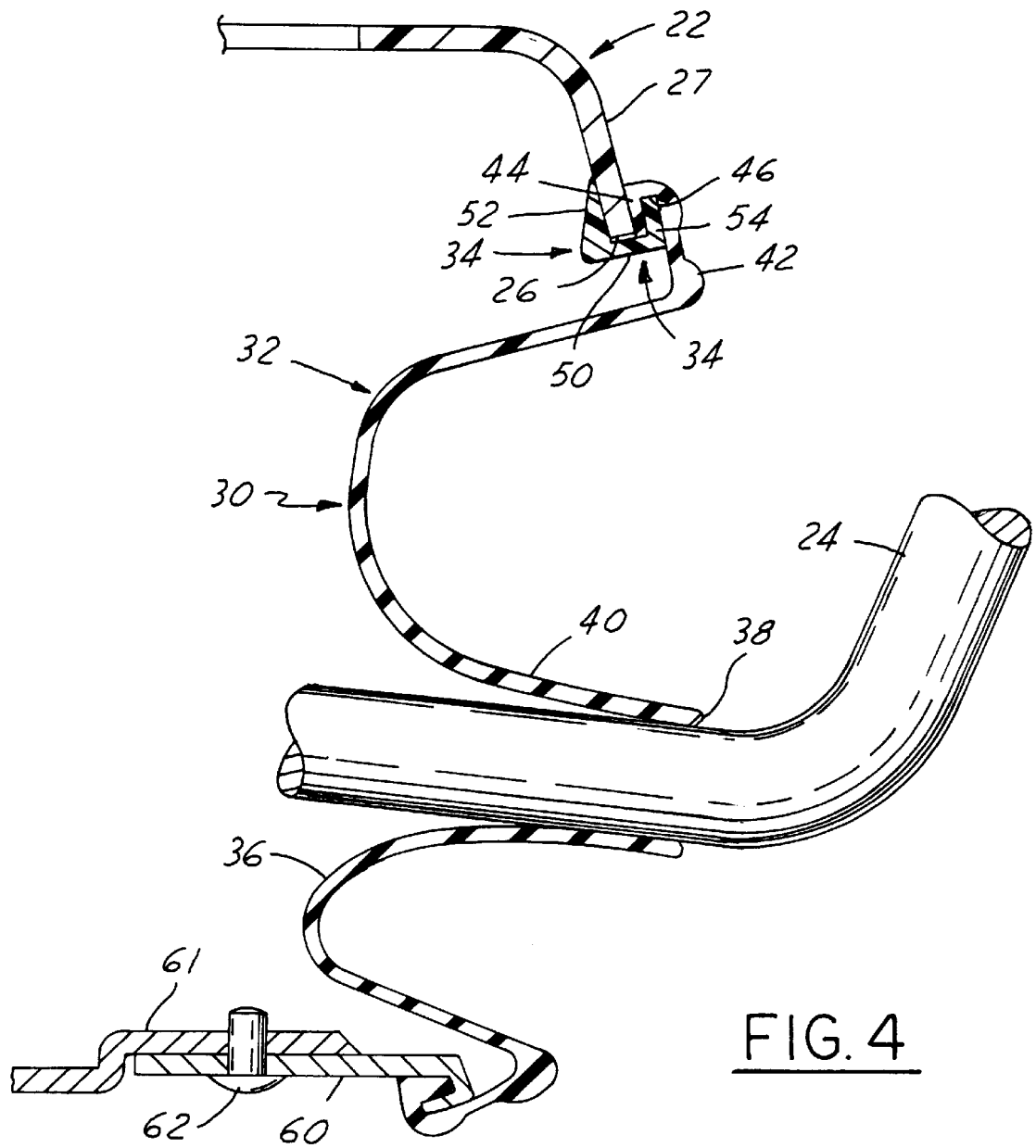
FIG. 4 is a sectional view taken on the line 4—4 in FIG. 2.
Figure 5:
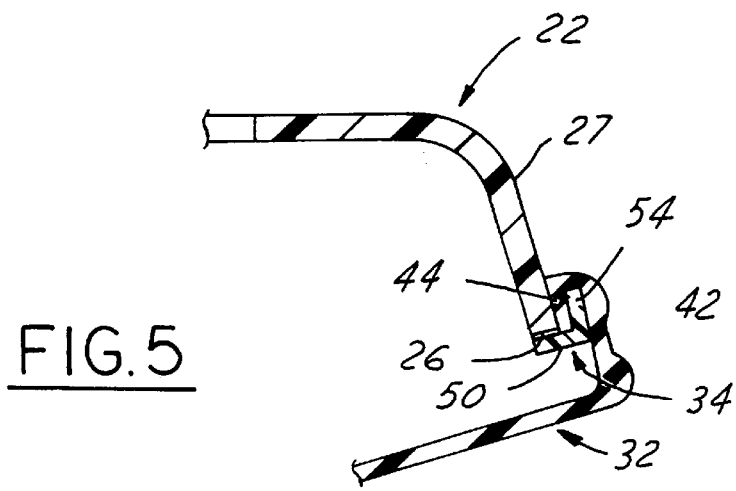
FIG. 5 is a sectional view taken on the line 5—5 in FIG. 2.

There is shown a steering column 10 including an elongated steering shaft 12 extending lengthwise within an elongated tubular jacket 14, and a steering wheel 16 on a tilt head 18 pivoted at 20 to the rear end of the steering shaft 12. The rear end of the jacket 14 and the tilt head 18 are disposed within a shroud 22. The shroud 22 is secured to the tilt head 18 by struts 23. A gear shift lever 24 is secured to the jacket 14 and extends outwardly through an opening 26 in a wall 27 of the shroud. A boot and attaching frame assembly 30 closes the opening 26. The opening 26 is large enough to accommodate tilting of the steering wheel and shifting of the gear shift lever 24. The shroud 22 has openings 31 and 33 to clear the jacket 14 and the connection between the tilt head 18 and the steering wheel 16.

The boot and attaching frame assembly 30 includes a boot 32 and an attaching frame 34. The boot is molded to the configuration shown from a sheet preferably made of a flexible, resilient, stretchable, elastomeric material such as natural or synthetic rubber. The frame is preferably made of a relatively rigid plastic or metal.

The boot 32 has a generally cup-shaped central portion 36 formed with a passage 38 which receives and seals around the gear shift lever 24. The passage 38 is formed in a somewhat tubular conical formation 40 in the central portion 36 of the boot.

The boot 32 has a peripheral or marginal portion 42 extending laterally outwardly from the central portion 36. The outermost part of the marginal portion 42 is folded inwardly upon itself to provide an annular terminal flange 44 and a laterally inwardly opening annular groove 46.

The frame 34 is provided to secure the boot 32 to the shroud 22. The frame 34 has an annular base 50 adapted to fit within the opening 26 in the wall 27 of the shroud. The frame 34 has a plurality of angularly spaced tabs 52 extending laterally outwardly from the base 50 to engage an inner surface portion of the wall 27 of the shroud around the opening 26. The frame has a continuous annular flange 54 extending laterally outwardly from the base into the groove 46 in the boot 32. The wall 27 of the shroud surrounding the opening 26 and the flange 44 of the boot are snugly received between the annular flange 54 and the tabs 52 of the frame. The annular flange 54 and the tabs 52 of the frame thus provide outer and inner retainers for locating and securing together the flange 44 of the boot and the wall 27 of the shroud. The inner and outer retainers are so spaced apart that the flange 44 of the boot and wall 27 of the shroud are tightly clamped together and the wall 27 is strongly reinforced. The terminal flange 44 of the boot presses and seals against the wall 27 of the shroud surrounding the opening 26.

The frame has an integral mounting strip 60 which is secured to an underside portion 61 of the wall of the shroud in a position such that the strip 60 is not visible to an occupant of a vehicle in which the steering column is installed. The securing of the mounting strip 60 to the shroud may be accomplished by a simple fastener 62.

To install the boot and attaching frame assembly 30, the boot 32 and frame 34 are joined together by inserting the annular flange 54 of the frame into the annular groove 46 of the boot. The frame is then inserted into the opening 26 of the shroud by fitting the base 50 of the frame within the opening, with the tabs 52 engaging the inner surface of the wall 27 of the shroud around the opening. The flange 44 of the boot and the wall 27 of the shroud are gripped tightly between the tabs 52 and the flange 54. The fastener 62 is then installed to attach the mounting strip 60 to the portion 61 of the wall of the shroud.

What is claimed is:

1. A boot and attaching frame assembly for closing an opening wall of a steering column shroud through which a gear shift lever extends comprising;

a flexible boot having a central portion provided with a passage adapted to receive the gear shift lever and an integral annular marginal portion surrounding said central portion, said marginal portion extending laterally outwardly from said central portion and folded inwardly upon itself to provide a terminal flange and to form a laterally inwardly opening groove, said terminal flange being adapted to engage an outer annular surface portion of the wall of the shroud around the opening therein, and an annular frame for securing said boot to the shroud, said frame having an annular base adapted to fit within the opening in the wall of the shroud, said frame having inner retainer means extending laterally outwardly from said base to engage an inner surface portion of the wall of the shroud around the opening therein, said frame having outer retainer means extending laterally outwardly from said base into the groove in the boot.

2. An assembly as defined in claim 1, wherein said inner and outer retainer means are spaced apart to snugly receive the wall of the shroud and the terminal flange of the boot.

3. An assembly as defined in claim 2, wherein said outer retainer means comprises a continuous annular flange.

4. An assembly as defined in claim 2, wherein said inner retainer means comprises a plurality of spaced apart tabs.

5. An assembly as defined in claim 2, wherein said frame has an integral mounting strip, and means for securing said mounting strip to the shroud.

6. An assembly as defined in claim 5, wherein said terminal flange is a continuous annular member adapted to form a continuous seal against the outer annular surface portion of the wall of the shroud around the opening therein, said inner and outer retainer means are spaced apart to snugly receive the wall of the shroud and the terminal flange of the boot, said outer retainer means comprises a continuous annular flange, and said inner retainer means comprises a plurality of spaced apart tabs.

7. An assembly as defined in claim 6, wherein said boot is made of a resilient, stretchable, elastomeric material, and said frame is made of a relatively rigid material.

8. An assembly as defined in claim 7, wherein said mounting strip is so located on said frame as to be invisible when secured to the wall of the shroud.

* * * * *